UNITED STATES PATENT OFFICE.

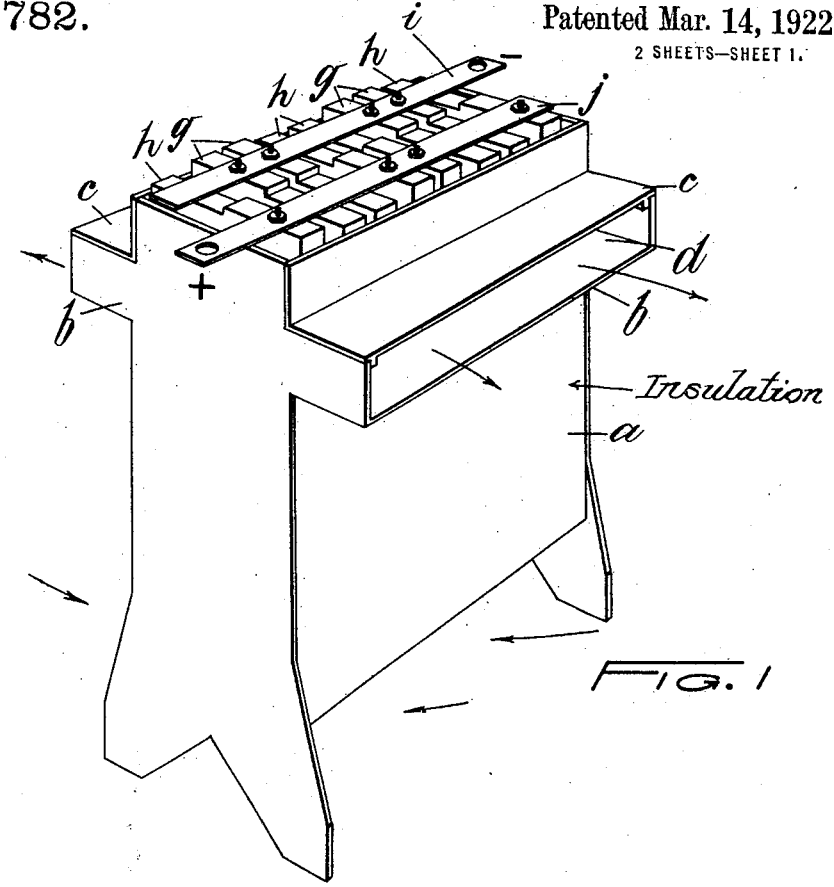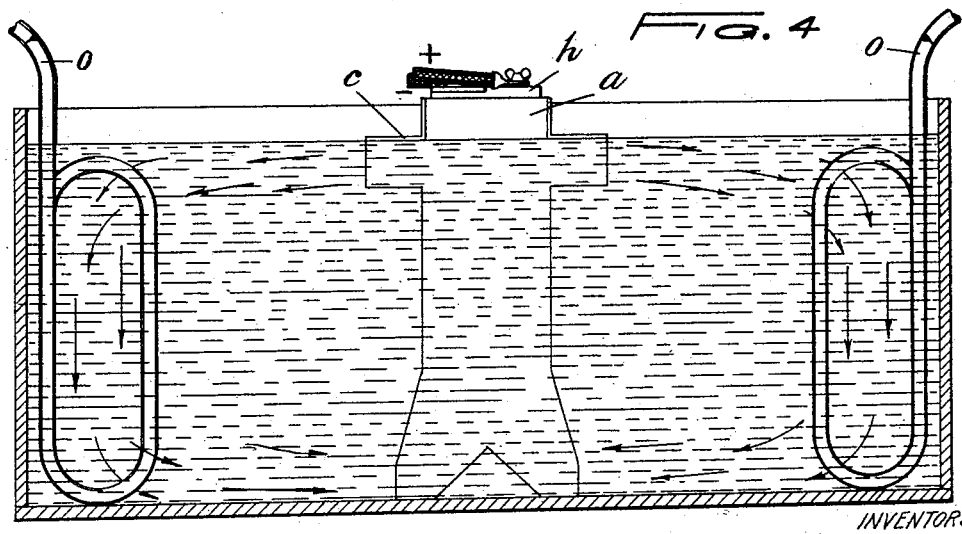

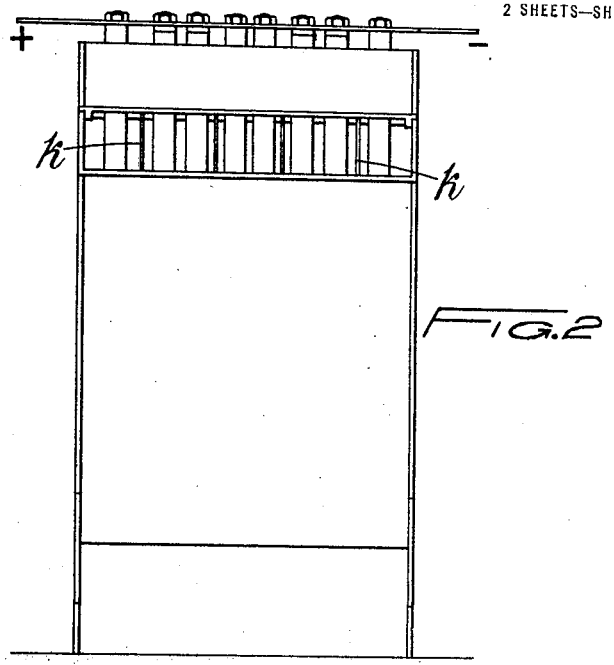
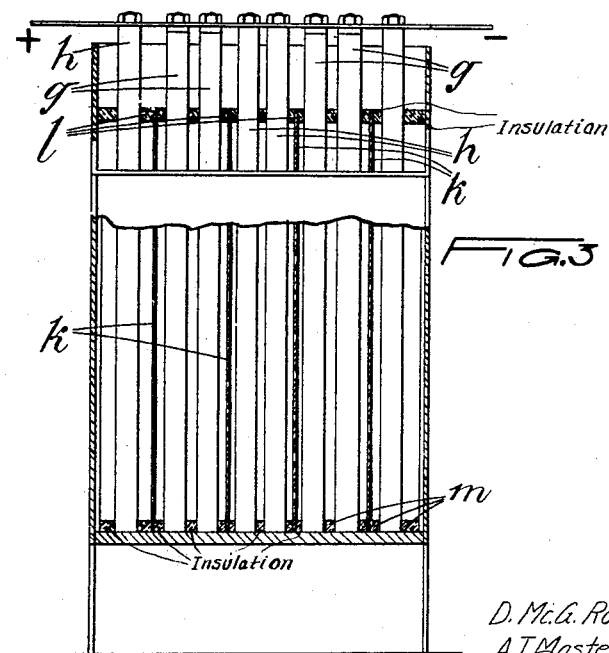

DAVID McGREGOR ROGERS AND ARTHUR THOMAS MASTERMAN, OF LONDON, ENGLAND.

ELECTROLYTIC APPARATUS FOR PREPARING HYPOCHLORITE SOLUTIONS.

1,409,782.    Specification of Letters Patent.    Patented Mar. 14, 1922.

Application filed November 30, 1921. Serial No. 518,984.

*To all whom it may concern:*

Be it known that we, DAVID MCGREGOR ROGERS and ARTHUR THOMAS MASTERMAN, both citizens of the United Kingdom of Great Britain and Ireland, and residents of 125, Bunhill Row, London, E. C. 1, England, have invented certain new and useful Improvements in Electrolytic Apparatus for Preparing Hypochlorite Solutions, of which the following is a specification, such as will enable others skilled in the art to which it appertains to make and use the same.

This invention relates to electrolytic apparatus for preparing hypochlorite solutions for bleaching, disinfecting and analogous purposes and of that kind in which a frame carrying electrode is placed in a brine bath and the brine liquid is circulated by the hydrogen chlorine rising between the electrodes.

According to the invention the said frame, which is wholly, or in sufficient part, made of non-conducting material has the electrodes arranged within it and is adapted to stand in a bath or tank or to be suitably suspended therein, said frame being open at the bottom and on two sides opposite the edges of the electrodes the said electrodes being electrically connected above the top of the frame and in such a manner that the electrical connections can be reversed so that the flow or passage of the electric current will be alternated as the reversal is made thereby any deposit on the electrodes made by the flow in one direction will be entirely displaced and precipitated when the reversal is made and a like result obtained by both directions.

The connecting or bus bars are preferably two plain straight bars passing across the tops of the electrodes and suitably connected to their respective electrodes through lead lugs each of which has a recess or is stepped so as to be out of contact with the bar with which it should not be connected.

The electrodes are preferably arranged in pairs of a like pole except that the endmost electrodes must be single. A perforated plate of non-conducting material is positioned between the adjacent positive and negative faces the edges of the electrodes and of the said perforated plates being a sufficiently close fit to the insides of the frame to prevent flow of liquid round the edges and loss of the current.

An example of the invention is shown in the accompanying drawings in which:—

Fig. 1 is a perspective view of a frame fitted with electrodes and connecting bars.

Fig. 2 shows the same in side elevation and

Fig. 3 is also a side elevation but with part removed and part broken away.

Fig. 4 illustrates the apparatus in use.

In this example the frame $a$ is made of vulcanite or other suitable material and open underneath and on two opposite sides so that when the frame is placed in a bath liquid can circulate as shown by the arrows, that is into the frame at the bottom and out at both sides.

The frame is constructed with a ledge or shelf $b$ on each side to direct the fluid outwardly and these two ledges have removable covers $c$. In use, the frame is placed in liquid the level of which is approximately that of the lower part of the cover $c$ so that the opening $d$ between the shelf and the cover is submerged, said opening extending the full width of the frame, as shown.

In this example eight electrodes are shown, those lettered $g$ being of one pole and those lettered $h$ of the other pole. It will be observed that the electrodes $g$ are connected to the bar $i$ and electrodes $h$ are connected to the bar $j$.

It will be observed that the electrodes $g$ pass under the bar $j$ but that they are stepped or cut away so as not to make contact therewith and simultaneously the electrodes $h$ are cut away so as not to make contact with the bar $i$.

In Figs. 2 and 3 in the latter of which the cover $c$ has been removed, perforated partitions $k$ are shown between the positive and negative electrodes and non-conducting packing or distance pieces are shown at $l$ and at $m$.

Electric connections are made at $-$ and $+$ and are interchangeable.

In Fig. 4 the frame $a$ is seen standing in a tank $n$ in which are cooling coils $o, o$. The arrows denote the flow of the liquid.

Of course it is to be understood that the indicated circulation of the liquid is due to the upward current of hydrogen and chlorine gases liberated in rapid bubbles between the plates.

What we claim is—

1. Apparatus for preparing hypochlorite solutions comprising a tank, a plurality of electrodes, perforated plates between the electrodes, a frame around the electrodes said frame having an open bottom and a side opening near the top of the frame.

2. Apparatus for preparing hypochlorite solutions comprising a tank, a plurality of electrodes, perforated plates between the electrodes, a frame around the electrodes said frame having an open bottom and openings on opposite sides near the top of the frame, said side openings extending throughout the full widths of the sides as a single opening.

3. Apparatus for preparing hypochlorite solutions comprising a tank, a plurality of electrodes, perforated plates between the electrodes, a frame around the electrodes said frame having an open bottom, openings on opposite sides of the frame adjacent the top thereof and shelves under the openings, said perforated plates extending from the lower ends of the electrodes to a plane in line with the upper edges of the side openings.

4. An apparatus for preparing hypochlorite solutions, a frame having imperforate ends and side walls and fully open at the bottom, each side wall being formed with an opening near the upper end thereof and extending throughout the full width of said wall, a plurality of electrodes arranged within the frame, and perforated plates between the electrodes.

5. An apparatus for preparing hypochlorite solutions, a frame having imperforate ends and side walls and fully open at the bottom, each side wall being formed with an opening near the upper end thereof and extending throughout the full width of said wall, a plurality of electrodes arranged within the frame and extending from a point above the bottom of the frame to and beyond the upper end thereof, and perforated plates between the electrodes.

6. Apparatus for preparing hypochlorite solutions comprising a tank, a plurality of flat electrodes in the tank and arranged in parallel relation to each other, perforated plates between electrodes of different polarity, a frame around the electrodes, bars resting on the frame and mechanically and electrically connecting electrodes of like polarity to each other, an opening in the bottom of the frame and openings in the side of the frame.

7. Apparatus for preparing hypochlorite solutions comprising a tank, a plurality of flat electrodes in the tank and arranged in parallel relation to each other, perforated plates between electrodes of different polarity, a frame around the electrodes, bars resting on the frame and mechanically and electrically connecting electrodes of like polarity to each other, openings in the lower part of the frame and in upper parts of the sides of the frame and cooling coils in the tank.

8. Apparatus for preparing hypochlorite solutions comprising a plurality of parallel electrodes of different polarity, perforated plates between adjacent electrodes of different polarity, a frame having an open top and a fully open bottom and openings in upper parts of the sides of the frame, said side openings extending for the full width of the frame, means carried by the frame to support the electrodes in the frame and a tank in which the frame can be placed.

9. Apparatus for preparing hypochlorite solutions comprising a plurality of parallel electrodes of different polarity, perforated plates between adjacent electrodes of different polarity, a frame having an open top and an open bottom and openings in upper parts of the sides of the frame, means carried by the frame to support the electrodes in the frame and bars to make electrical connection with the electrodes from a supply circuit and a tank in which the frame can be replaced.

It witness whereof we have hereunto set our hands in presence of two witnesses.

DAVID McGREGOR ROGERS.
ARTHUR THOMAS MASTERMAN.

Witnesses:
EDWARD C. DEACON,
WALTER I. DEKERTEN.